May 5, 1925.

E. A. RUSSELL

HOSE COUPLER LOCK

Filed Oct. 5, 1923

Inventor,
Edward A. Russell,
By Barrett Truman,
Attorneys

May 5, 1925.
E. A. RUSSELL
HOSE COUPLER LOCK
Filed Oct. 5, 1923
1,536,814
2 Sheets-Sheet 2
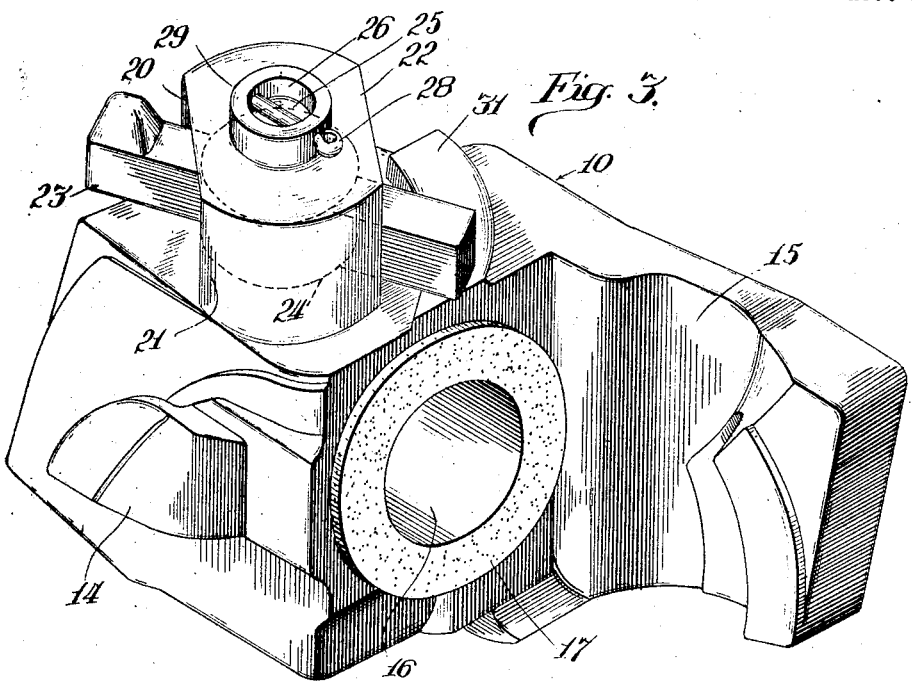
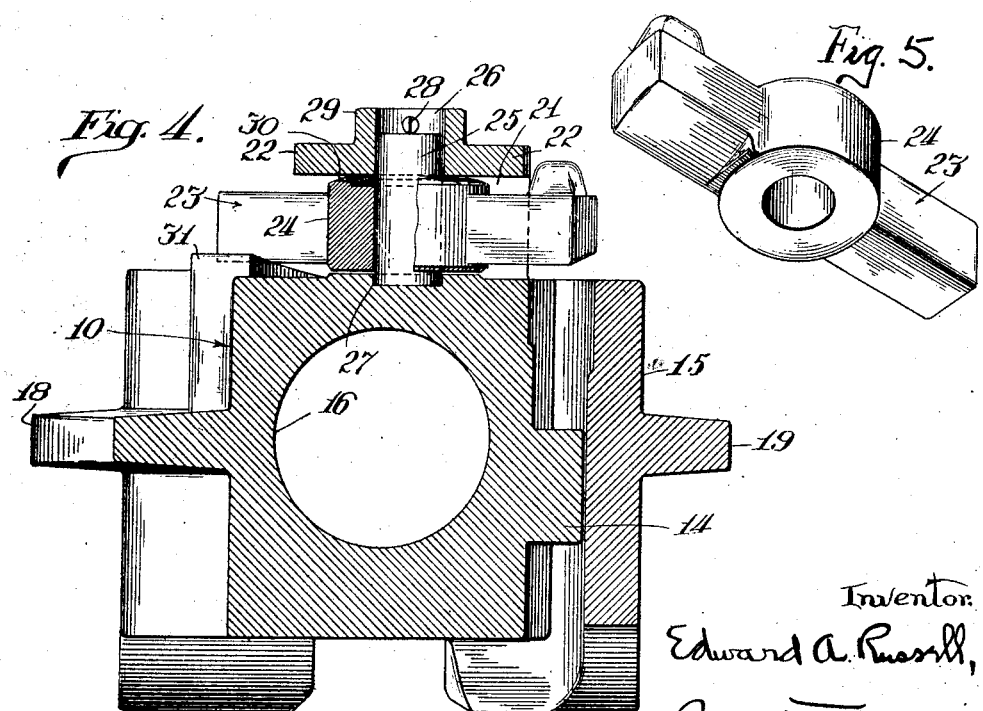
Inventor.
Edward A. Russell,
by Barrett Truman,
Attorneys Patented May 5, 1925.

1,536,814

UNITED STATES PATENT OFFICE.

EDWARD A. RUSSELL, OF CHICAGO, ILLINOIS, ASSIGNOR TO VAPOR CAR HEATING COMPANY, INC., OF CHICAGO, ILLINOIS, A CORPORATION OF NEW YORK.

HOSE-COUPLER LOCK.

Application filed October 5, 1923. Serial No. 666,797.

*To all whom it may concern:*

Be it known that I, EDWARD A. RUSSELL, a citizen of the United States, residing at Chicago, in the county of Cook and State of Illinois, have invented certain new and useful Improvements in Hose-Coupler Locks, of which the following is a specification.

My invention relates to hose coupler locks and has for its principal object the provision of a new and improved form and arrangement of parts by which a pair of mating hose couplers may be effectively locked together after the ordinary clamping inter-engagement, the arrangement being such, preferably, that the desired locking may be effected by the use of a coupler equipped with my improved locking means when mated with the ordinary coupler as well as when mated with another coupler likewise equipped with the locking means.

It is another object of my invention to improve devices of this type in sundry details hereinafter pointed out.

The preferred means by which I have accomplished my several objects are illustrated in the drawings and are hereinafter specifically described. That which I believe to be new and desire to cover by this application is set forth in the claims.

In the drawings—

Fig. 3 is a perspective view of the coupler equipped with my improvements.

Fig. 4 is a vertical cross section taken substantially on line 4—4 of Fig. 1; and Fig. 5 is a perspective view of the bolt by which the locking is effected.

Figure 1:
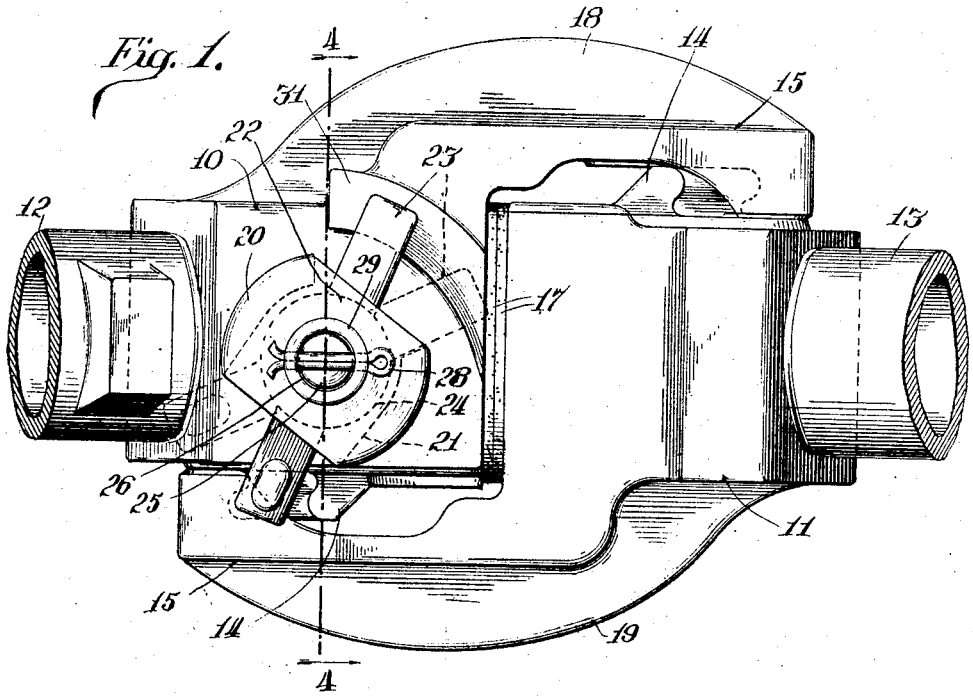
Fig. 1 is a top plan view of a pair of interengaged hose couplers, one of which is provided with my improved locking means.

Referring to the several figures of the drawings, in which corresponding parts are indicated by the same reference characters, 10 and 11 indicate the bodies of mating hose couplers mounted respectively upon sections of flexible hose 12 and 13. Each of the bodies 10 and 11 is provided with a lug 14 of any approved type upon its side face, in position to have effective engagement with the arm 15 of the other coupler, the arrangement being such that the inter-engagement of the arms 15 with the lugs 14 is effected by a slight rocking movement of one or both of the couplers about a transverse axis, as is well understood in the art. The body of each of the couplers is provided with a longitudinal passage 16 in the ordinary manner, as is best shown in Fig. 4, and gaskets 17 of any approved type are provided for effecting the desired working fit between the longitudinal passages of the couplers. Strengthening ribs 18 and 19 are provided on the outer faces of the bodies 10 and 11, respectively, the rib of each member being extended also along the arm 15 thereof.

In the construction illustrated, one of the couplers only is equipped with my improved locking means, but it will be understood that it is immaterial in practice whether only one or both of the members are so equipped. As is best shown in Fig. 1, the body 10 is provided on its upper face with a housing comprising spaced wall portions 20 and 21 joined by a horizontally disposed plate 22, such parts in the construction shown being cast integrally with the body 10. Extending through the housing so formed, there is a bar or bolt 23 formed with an intermediate collar 24 which is held rotatably in position in the housing by means of a steel pin 25 which extends through an opening 26 in the plate 22, through the collar 24, and into a suitable opening 27 formed in the upper face of the body 10 below the plate 22, the pin being held from withdrawal by means of a cotter pin 28 passing through the sides of a boss 29 formed on the upper face of the plate 22 about the opening 26. A spring washer 30 of any approved type is preferably interposed between the plate 22 and the collar 24 about the pin 25 for holding the collar yieldingly in contact with the upper face of the body 10, whereby the collar 24 and the bolt 23 are held by friction from swinging idly.

Figure 2:
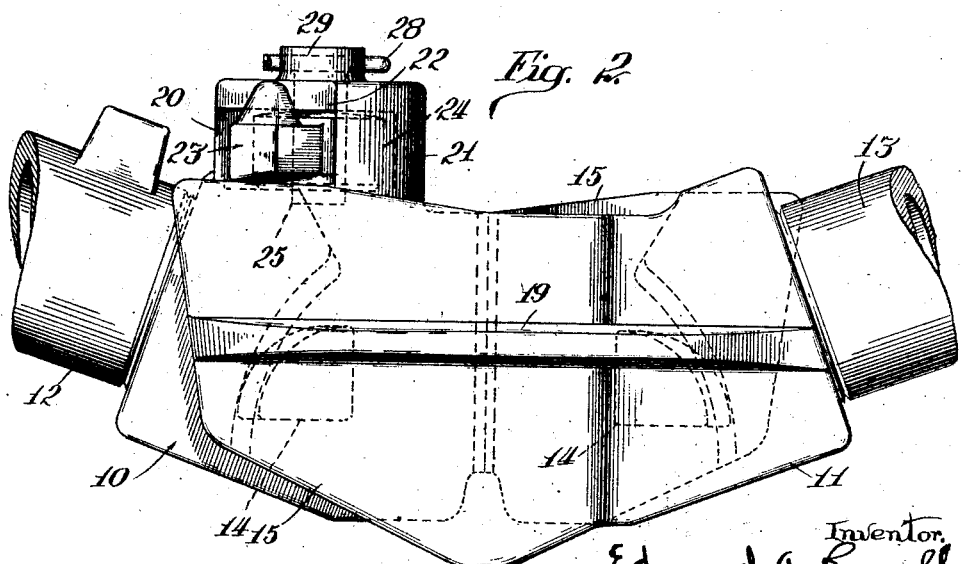
Fig. 2 is a side view of the parts shown in Fig. 1.

With the bolt 23 swung to the limit of its motion in clockwise drection in Fig. 1, the coupler members are inter-engaged in the well understood manner. The bolt 23 is then swung in counter clockwise direction in said Fig. 1 into the position shown in solid lines, in which position the end of the bolt extends over the adjacent end of the arm 15 of the other coupler, as is clearly shown in Figs. 1 and 2. With the bolt in this position, it is impossible to uncouple the members, since the bolt prevents the members from having the longitudinal rocking movement necessary for the disengagement of the arms 15 from the lugs 14.

For holding the bolt 23 in its locking position, as shown in solid lines in Fig. 1, I have provided a cam 31 upon the upper face of the body 10, the cam in the construction shown being arranged concentrically about the axis of the bolt 23. The inclination of the cam 31 and the position of the cam with respect to the bolt are such that when the bolt is forced up the cam to its operative position, as shown in Fig. 1, the bolt 23 and collar 24 are wedged tightly between the cam and the plate 22 of the housing, in which position the bolt is held by friction securely in place.

While I prefer to employ the construction as here shown, it will be understood that I do not wish to limit myself to details of such construction, except so far as such details are specifically claimed, inasmuch as it is evident that various changes may be made without departing from the spirit of my invention.

I claim:

1. A hose coupler lock for preventing disengagement of mating couplers comprising a bolt pivotally mounted on one of the coupler members in position to be moved into engagement with the other coupler member for preventing rocking of one member about a transverse axis with respect to the other member, the portion of the second coupler member with which the bolt is engaged being formed to engage the bolt with a continuously increasing pressure as the bolt is moved to locking position for preventing its displacement from locking position.

2. A hose coupler lock for preventing disengagement of mating couplers comprising a bolt pivotally mounted on one of the coupler members in position to be swung substantially horizontally into close proximity to the other coupler member for preventing rocking of one member about a transverse axis with respect to the other member, and a cam underlying the path of the bolt as it swings into operative locking position adapted to engage the bolt with an increasing pressure as the bolt is moved to locking position to prevent its displacement from locking position.

3. A hose coupler lock for preventing disengagement of mating couplers comprising a bolt pivotally mounted on one of the coupler members in position to be swung substantially horizontally into close proximity to the other coupler member for preventing rocking of one member about a transverse axis with respect to the other member, means serving by friction to hold the bolt from swinging idly, and other means adapted by engagement with the bolt at the end of its movement into operative locking position normally to prevent displacement of the bolt from its locking position.

4. A hose coupler lock for preventing disengagement of mating couplers comprising a bolt pivotally mounted on one of the coupler members in position to be swung substantially into close proximity to the other coupler member for preventing rocking of one member about a transverse axis with respect to the other member, means serving by friction to hold the bolt from swinging idly, and a cam adapted at the end of the movement of the bolt into operative locking position normally to prevent displacement of the bolt from its locking position.

5. A hose coupler lock for preventing disengagement of mating couplers, comprising a bolt pivotally mounted at an intermediate point on one of the coupler members in position to have one end swung into close proximity to the other coupler member for preventing rocking of one member about a transverse axis with respect to the other member, and a cam underlying the other end of the bolt adapted to engage the bolt with a pressure which increases as the bolt is swung to operative position to hold the bolt normally by friction from displacement from operative position.

6. A hose coupler lock for preventing disengagement of mating couplers comprising a bolt pivotally mounted on a vertical axis on the upper face of the body of one of the coupler members in position to swing into close proximity to the upper face of the arm of the other coupler member for preventing the members from rocking about a horizontal axis with respect to each other, and yielding means adapted by pressure on the bolt normally to hold the bolt against swinging idly.

7. A hose coupler lock for preventing disengagement of mating couplers comprising a bolt pivotally mounted on a vertical axis on the upper face of the body of one of the coupler members in position to swing into close proximity to the upper face of the arm of the other coupler member for preventing the members from rocking about a horizontal axis with respect to each other, and a cam on the body underlying the bolt adapted by engagement with the bolt at the end of the swing of the bolt to operative locking position to hold the bolt normally by friction from displacement from its operative position.

8. A hose coupler lock for preventing disengagement of mating couplers comprising a bolt pivotally mounted on a vertical axis on the upper face of the body of one of the coupler members in position to swing into close proximity to the upper face of the arm of the other coupler member for preventing the members from rocking about a horizontal axis with respect to each other, yielding means adapted by pressure on the bolt normally to hold the bolt against swinging idly, and a cam on the body underlying the bolt adapted by engagement with the bolt at the end of the swing to operative position to hold the bolt normally by friction from displacement from operative position.

9. A hose coupler lock for preventing disengagement of mating couplers, comprising a housing on the upper face of the body of one of the coupler members, a bolt extending through said housing, and a pin passing through aligned openings in the housing, the bolt, and the body, for mounting the bolt pivotally in position to swing into close proximity to the other coupler member for preventing the members from rocking about a horizontal axis with respect to each other.

10. A hose coupler lock for preventing disengagement of mating couplers, comprising a housing on the upper face of the body of one of the coupler members, a bolt extending through said housing, a pin passing through aligned openings in the housing, the bolt, and the body, for mounting the bolt pivotally in position to swing into close proximity to the other coupler member for preventing the members from rocking about a horizontal axis with respect to each other, and a second pin carried by said housing extending across the end of the first named pin for preventing withdrawal thereof.

11. A hose coupler lock for preventing disengagement of mating couplers, comprising a housing on the upper face of the body of one of the coupler members, a bolt extending through said housing, a pin passing through aligned openings in the upper wall of the housing and the bolt for mounting the bolt pivotally in position to swing into close proximity to the other coupler member for preventing the members from rocking about a horizontal axis with respect to each other, and a spring mounted on said pin between the bolt and the upper wall portion of the housing for pressing the bolt yieldingly into frictional engagement with the body.

12. A hose coupler lock for preventing disengagement of mating couplers, comprising a housing on the upper face of the body of one of the coupler members, a bolt extending through said housing, a vertically disposed pin upon which said bolt is pivotally mounted within said housing, and a spring washer mounted upon said pin between the bolt and the upper wall of the housing for pressing the bolt yieldingly against the body for preventing the bolt from swinging idly.

EDWARD A. RUSSELL.